Aug. 2, 1938.                A. URFER                2,125,408
                    ENGINE SYNCHRONISM INDICATOR
              Original Filed Sept. 27, 1930    2 Sheets-Sheet 1
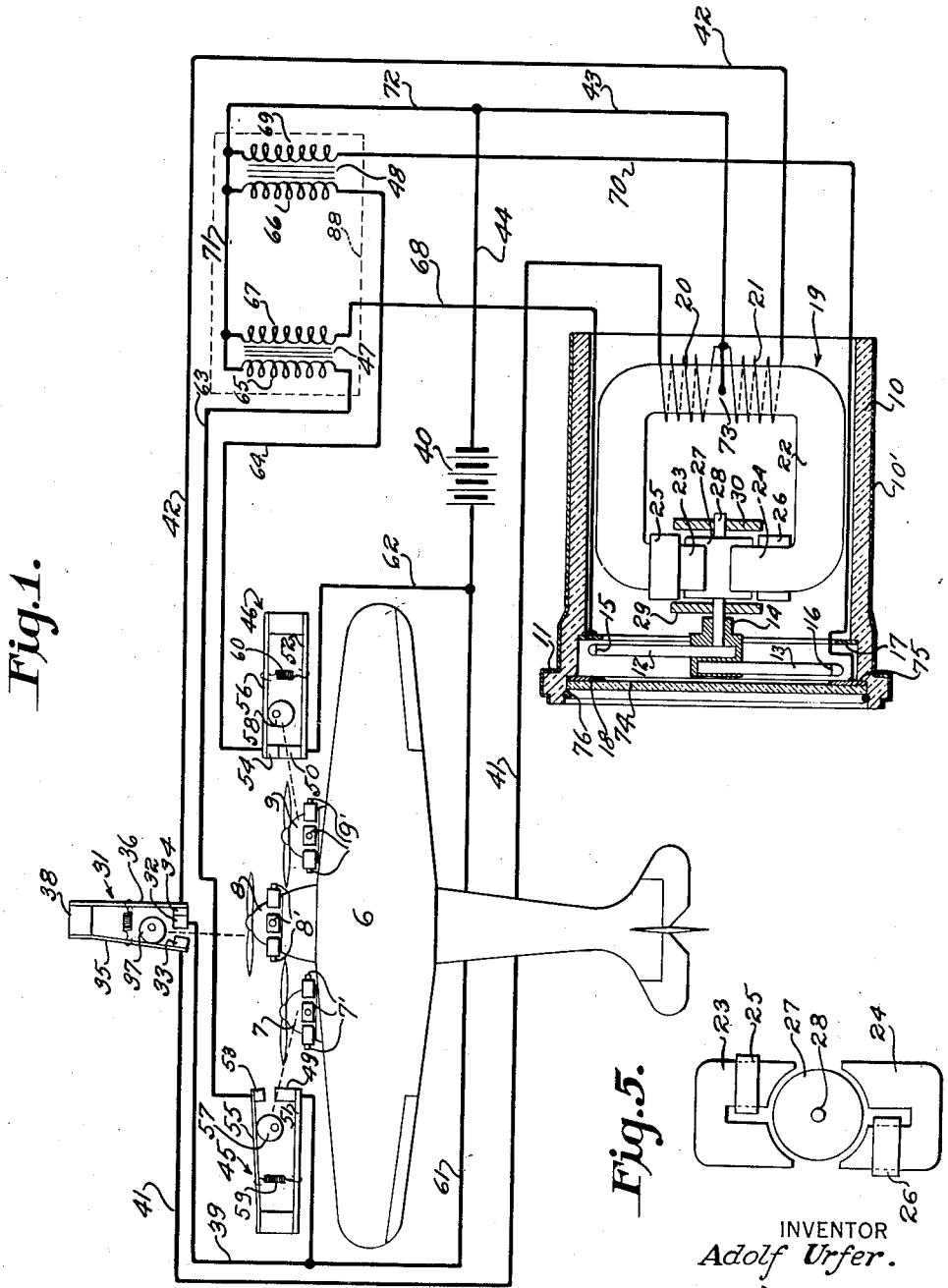
INVENTOR
Adolf Urfer.
BY F. B. Smith
ATTORNEY Aug. 2, 1938.  A. URFER  2,125,408
ENGINE SYNCHRONISM INDICATOR
Original Filed Sept. 27, 1930  2 Sheets-Sheet 2
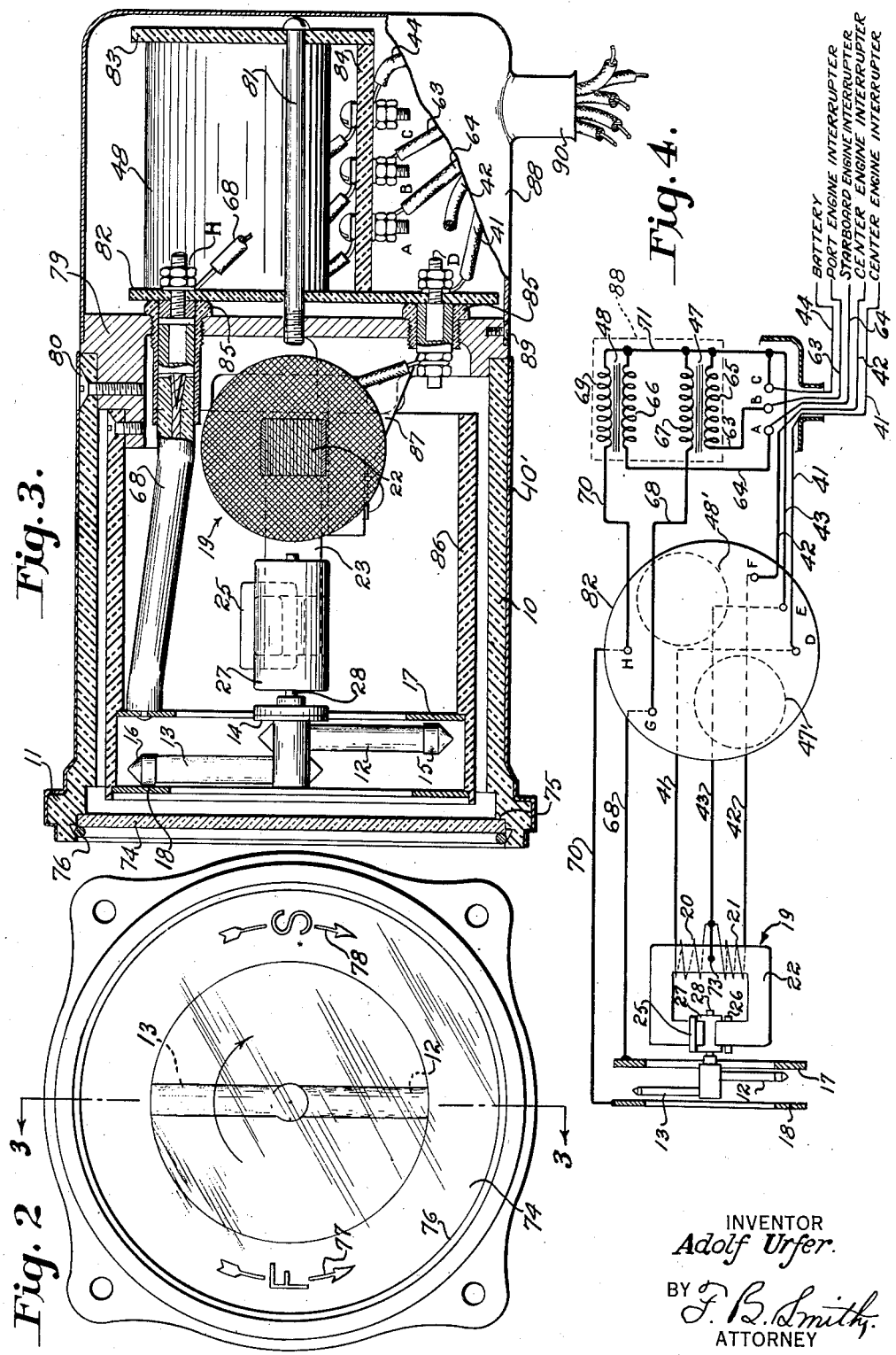
INVENTOR
Adolf Urfer.
BY F. B. Smith
ATTORNEY Patented Aug. 2, 1938

2,125,408

UNITED STATES PATENT OFFICE 2,125,408

ENGINE SYNCHRONISM INDICATOR

Adolf Urfer, New Rochelle, N. Y., assignor to Pioneer Instrument Company, Incorporated, Brooklyn, N. Y., a corporation of New York Application September 27, 1930, Serial No. 484,919
Renewed December 23, 1936

11 Claims. (Cl. 177—311)

The present invention relates to electrical apparatus, and more particularly to means for indicating the synchronism of a plurality of engines or motors or other revolving mechanisms.

The indicating device embodying the invention is of the stroboscopic type, wherein a gas discharge device, as for example a neon tube or lamp, is provided for each of the revolving mechanisms whose speed is to be compared with that of another, and periodically illuminated at a frequency corresponding to the speed of its respective mechanism or a multiple thereof, said discharge devices being simultaneously rotated at a speed corresponding to the speed of the revolving master mechanism with which the speeds of the other mechanisms are to be compared. In this manner, when the tubes or lamps are periodically illuminated at the frequency at which they are rotated, said tubes will appear to be illuminated continuously and will appear to be standing still, thus indicating that the mechanisms are all rotating at the same speed. If, however, the speed of the mechanisms is decreased or increased relative to the master mechanism, the tubes will appear to be moving clockwise or counterclockwise, depending upon the direction of actual rotation of said tubes.

Heretofore devices of the above type have been employed in multi-engined aircraft for indicating the synchronism of the several engines and utilized the ignition system of each engine as a source of high frequency currents for producing the periodic illuminations of the neon lamps and for energizing a synchronous electric motor, by means of which the lamps were rotated, as for example, in the present inventor's co-pending application Serial No. 439,823, filed March 28, 1930. While indicators of this type employing the ignition systems of the engines for producing the spark discharges in the neon lamps function very satisfactorily and perform with the highest efficiency in most installations, it has been found that when used on aircraft equipped with radio communication systems, the high frequency currents transmitted from the engines to the indicator located on the instrument panel in the cockpit of the plane, sometimes a distance of thirty feet, produce interference in the reception of radio signals. Various means have been proposed for eliminating such interference, as by shielding the ignition cables leading from each of the engines to the indicator located on the instrument panel of the plane, but due to the great length of the cables, the shielding proved inefficient in that the ignition systems were then rendered inoperative and the spark plugs failed to fire because of electrical losses created by the condenser action of the shield when high frequency currents were transmitted through said cables. It is therefore one of the objects of the present invention to provide a novel indicator of the above type which may be employed in the vicinity of radio receivers, without interfering with the reception of signals.

Another object is to provide a novel indicator of the stroboscopic type which is adapted to function independently of the ignition systems of the engines with which it is employed and therefore may be used with any type of revolving mechanisms to indicate the synchronism thereof.

Another object is to provide a novel indicator of the above type in which transmission of high frequency currents between the engines and the indicator are eliminated.

Another object is to provide a novel system for indicating the synchronism of a plurality of revolving mechanisms, which may be readily shielded without excessive electrical losses.

A further object is to provide a novel indicator of the stroboscopic type which includes an improved form of transmission whereby the indicator may be mounted at any distance relative to the engines whose relative speed is to be indicated, without producing radio interference.

Another object is to provide an instrument of the above type including a novel electrical transmission system whereby said instrument is adapted to indicate concurrently the relative speeds of a plurality of engines or other revolving mechanisms, without producing radio interference.

Another object is to provide a novel stroboscopic indicator utilizing a plurality of illuminating means adapted to be connected to different engines whereby a simultaneous indication of the speeds of a plurality of engines with respect to a comparator may be obtained.

Another object is to provide novel means for indicating the synchronism of a plurality of engines which gives a constant, easily visible, and unmistakable indication of the relative speeds of the engines.

A still further object is to provide a novel indicator of the stroboscopic type in which the indicating elements are at all times in direct view of the operator.

Still another object of the invention is to provide a novel indicator which is economical to construct, which may be made small, compact, and light, which requires no adjustments, and which is highly efficient in operation.

The above and other objects and advantages of the invention will appear more fully hereinafter from consideration of the detailed description which follows, together with the accompanying drawings, wherein is illustrated one embodiment of the invention. It is to be expressly understood, however, that the drawings are for the purpose of description only, and are not designed as a definition of the limits of the invention, reference being had for this purpose to the appended claims.

In the drawings, wherein like reference characters refer to like parts throughout the several views, Fig. 1 is a diagrammatic representation of one form of the device as applied to a tri-motored airplane, the indicating instrument and the transmission being shown on an enlarged scale and partly in section;

Fig. 2 is a front view of one form of an indicating device;

Fig. 3 is a longitudinal section taken on line 3—3 of Fig. 2 with a portion of the shield broken away;

Fig. 4 is another diagrammatic representation illustrating the manner in which the device of Fig. 3 is electrically connected; and Fig. 5 is an end view of one form of self-starting synchronous motor adapted for use with the device.

Referring now to the drawings, the embodiment of the present invention illustrated therein comprises an indicator of the stroboscopic type associated with a plurality of motors or engines the synchronism of which is to be indicated at a remote point, and in which a novel transmission system is employed for providing energy to the illuminating means and to the actuating means of the indicator, whereby high voltage high frequency currents are confined to the vicinity of the indicator and are not transmitted between the engines and the indicator. In this manner radio interference is eliminated and the use of the ignition systems of the engines for actuating the indicator is entirely dispensed with.

In the form shown diagrammatically in Fig. 1, the novel indicator is employed on an airplane 6 for indicating the synchronism of a plurality of engines of the plane indicated at 7, 8, and 9, provided the ignition means such as spark plugs 7', 8', and 9' although said engines may be of the self-ignition type. The indicator comprises a casing 10 of some suitable insulating material as, for example, Bakelite, having a layer 10' of suitable shielding material such as aluminum electrically deposited therein to prevent radiation of energy which would cause interference with radio reception. The casing is provided with a flange 11 for securing the device to the instrument panel of the airplane by any suitable means, such as screws (not shown). A pair of gas discharge devices, as for example neon lamps 12 and 13, are rotatably supported within the casing as by means of a metallic mounting member 14 which also serves as a common terminal for one end of the lamps, the latter being positioned thereon preferably in diametrically opposed relation. The opposite ends of the lamps are provided with metallic caps 15 and 16 which serve as the other terminals of the lamps in conjunction with a pair of metallic rings 17 and 18 mounted in close proximity thereto within casing 10 and coaxial with the mounting member 14. The lamps are adapted to be periodically illuminated at a frequency corresponding to the respective engine or motor with which each lamp is associated, in a manner to be described hereinafter.

The center motor or engine 8 is preferably employed as the standard with which the speeds of the two outboard motors 7 and 9 are to be compared, and to this end means are provided for rotating the neon lamps 12 and 13 at the speed of said center engine or at any desired fixed ratio thereto. In the form shown, said means comprise a self-starting synchronous motor 19 of any suitable type adapted to be actuated by pulsations of current flowing through field coils 20 and 21 which are adapted to energize a laminated field magnet 22 and arranged to change the polarity of said field magnet as the coils are energized in sequence.

The pole pieces 23 and 24 of the field magnet are divided into pairs (Fig. 5) and the diametrically opposite members are provided with shading coils 25 and 26 to delay the magnetization of said members. A rotor 27 of some suitable magnetizable material, preferably hardened steel, is adapted to rotate between the pole pieces 23 and 24 under the action of the rotating or alternating field produced by the energization in sequence of the field coils 20 and 21. The rotor is suitably mounted on a shaft 28 journaled in bearings 29 and 30, which are preferably of the jewel type, and to which is attached at its outer end and rotatable therewith, mounting member 14.

Means are provided for reversing the polarity of the field magnet 22 by alternately energizing the coils 20 and 21, and in the embodiment illustrated, an interrupter 31 is employed having a fixed contact 32 and a pair of movable contacts 33 and 34. The interrupter is mounted on the center engine 8 and preferably adjacent the usual tachometer outlet thereof. Movable contacts 33 and 34 are carried by arms 35 and 36 which are adapted to be operated by an eccentric cam 37 driven from a rotating part of the engine, such as the usual tachometer drive, to alternately open and close the circuit between the stationary contact 32 and the movable contacts 33 and 34 in synchronism with the rotation of the engine. The interrupter 31 is suitably insulated from the engine, as by means of a spacing block 38, which may be of Bakelite or any other suitable insulating material. It will be understood that the cam 37 may be driven at engine speed or at any desired fixed ratio thereto, by suitable mechanical connections, and that said cam may be provided with any desired number of lobes in order to secure the most desirable rate of operation of the contacts. The fixed contact 32 is connected by a lead 39 to a suitable source of direct current, such as a battery 40, while movable contacts 33 and 34 are connected by leads 41 and 42 to the outer terminals of field coils 20 and 21, respectively, of the synchronous electric motor 19. The other ends of said field coils are connected with the other terminal of the battery by means of leads 43 and 44.

It will now be apparent that when the engine 8 is operating, cam 37 will be driven thereby at the same speed or at any desired fixed ratio to said speed, thereby alternately opening and closing the circuit between the stationary contact 32 and the movable contacts 33 and 34, thus energizing winding 20 for one-half revolution of the engine and winding 21 for the other half revolution. In this manner, the polarity of field magnet 22 is reversed once during each revolution of the engine by virtue of the opposed relation of said windings, thereby causing the rotor 27 to rotate in synchronism with the rotation of cam 37. Therefore, lamps 12 and 13 will revolve in synchronism with the engine 8.

Means are now provided for illuminating the neon lamps 12 and 13 periodically in accordance with the speed of the outboard motors 7 and 9, with which the lamps are associated, by producing a spark discharge in said tubes once per revolution of their respective engines.

In the embodiment illustrated, a novel low voltage transmission system is employed which comprises a pair of interrupters 45 and 46 associated with outboard engines 7 and 9, respectively, and a pair of transformers 47 and 48 for translating the low voltage direct current pulsations into high voltage high frequency currents in a manner to be later described. The interrupters are provided respectively with stationary contacts 49 and 50 carried by stationary arms 51 and 52 and movable contacts 53 and 54 carried by arms 55 and 56, the latter being adapted to be operated by eccentric cams 57 and 58 against the tension of springs 59 and 60 to alternately open and close said contacts in synchronism with the rotation of their respective engines with which they are associated. Cams 57 and 58 may be driven at engine speed of the respective engines, or at any desired fixed ratio thereto, by suitable mechanical connections, and may be provided with any desired number of lobes in order to secure the most suitable rate of operation of the contacts as in the case of cam 37.

Stationary contacts 49 and 50 are connected by leads 61 and 62 to one terminal of the battery 40, while movable contacts 53 and 54 are connected by means of leads 63 and 64 to the primary windings 65 and 66 of the transformers 47 and 48, respectively. The transformers are preferably located adjacent the casing of the device whereby long high tension leads between the engines and the device are eliminated, thus substantially eliminating radio interference produced thereby, and are shielded to prevent radiation of disturbances from said transformers. One end of the secondary 67 of transformer 47 is connected to the metallic ring 17 by means of the lead 68, while one end of the secondary 69 of transformer 48 is connected to the metallic ring 18 by means of the lead 70. The two transformers are connected together by means of a lead 71 to provide a return path for the primary windings to the battery 40 by means of the lead 72 and the lead 44. The return path of the secondaries is through the neon lamps 12 and 13 when a spark discharge occurs therein and through mounting member 14 of field magnet 22 through the leads 43 and 72, the former being electrically connected with field magnet 22 by means of a common connection indicated at 73. The conductors 41, 42, 44, 63 and 64 which lead from the interrupters and battery may also be shielded in a common cable shield without producing any losses or weakening of the high tension currents due to distributed capacity of the shield being relatively ineffective for low tension impulses such as are transmitted through said conductors.

It will be apparent that as engines 7 and 9 are operating, cams 57 and 58 will be driven thereby at synchronous speeds, thus causing contacts 53 and 54 to break circuits of the primaries 65 and 66 once per each revolution of the engine. The circuit interruption thus produced in the primary circuits will cause high frequency currents to be induced in the secondary windings 67 and 69 of the transformers and producing a spark discharge in the neon lamps 12 and 13 at the instant that contacts 53 and 49 and 54 and 50 are closed by virtue of the high tension alternating currents passing through the condenser coupling formed between the metallic caps 15 and 16 and the metallic rings 17 and 18, causing the lamps to be illuminated once per each revolution of the respective engines with which said lamps are associated. If the usual tachometer drive be employed, in which the tachometer shaft is generally rotated at one-half engine speed, then the shaft 28 and lamps 12 and 13 will make one revolution per every two revolutions of the engines and the lamps will flash once every other revolution.

A closure plate 74 of suitable transparent material, such as glass, Celluloid, or the like, is mounted in the end of the casing 10 and retained in position against a shoulder 75 formed in the casing, by means such as a spring ring 76, and may carry suitable directional indicia such as arrows 77 and 78 (Fig. 2) marked appropriately "F" and "S" to indicate whether the outboard motors are running faster or slower relative to the center motor.

The synchronism of the outboard motors relative to the center motor is indicated on the device as follows: Assuming that the motor 19 rotates in the direction of the arrow in Fig. 2, then if outboard engines 7 and 9 are rotating at the same speed as center engine 8, the lamps 12 and 13 will always occupy the same position at the time that the flash therein occurs. The lamps will thus appear to the operator to be stationary. If engines 7 and 9 rotate more slowly than engine 8, the lamps will make more than one complete revolution between every flash and will consequently appear to the operator to be rotating in the direction of the index 78 with a speed corresponding to the difference in speed between the outboard and center engines. On the other hand, if engines 7 and 9 are rotating faster than engine 8, the flashes will occur before the lamps have made a complete revolution and the lamps, accordingly, will appear to the operator to be rotating backwards in the direction of the index 77. The operator is therefore merely called upon to adjust the throttle of the outboard engines until the lamps appear to be standing still, whereupon he knows that all three engines are in exact synchronism.

In order to differentiate the outboard motors from each other, the neon lamp which is associated with the port or left-hand motor may be filled with a suitable gas to produce a red color when illuminated, and the lamp which is associated with the starboard or right-hand motor may be filled with a gas to produce a green color when illuminated, thereby giving an appropriate indication to show whether the port or starboard engine is running faster or slower than the center engine. Since the operator is enabled in this device to view the lamps directly, without the interposition of screens or reflectors of any kind, it is obvious that the indication is always clear and unmistakable, regardless of external light conditions.

It will be readily appreciated that the device is adaptable to a power plant involving any number of units simply by providing several lamps on the mounting member 14 suitably spaced from each other, and suitable means for indicating the units with which the lamps are associated.

In Fig. 3 there is illustrated one form of mechanical embodiment of the device, wherein the transformers are suitably attached to the casing of the device to provide a unitary structure whereby long leads for connecting the secondaries of said transformers to the respective lamps are eliminated and the transmission of high frequency currents is confined to the vicinity of the device, thus eliminating radio interference which is generally produced in systems and devices of this type which employ ignition systems of the engines for producing the spark discharges in the lamps and which require long leads (sometimes 30 feet) for transmitting the high frequency currents from the engines to the indicating device.

In the form shown a cylindrical supporting member 79 is secured to the casing in any suitable manner, as by means of screws 80, for mounting the transformers 47 and 48 thereto as by means of a screw 81. Insulating discs 82 and 83 are provided at the opposite ends of the transformers for insulating the latter from the plate 79, and interposed between said discs at right angles thereto is a plate 84 of some suitable insulating material on which are carried binding posts A, B, and C, which provide means for connecting the conductors or leads from the two outboard engine interrupters and the battery. The binding posts A and B are connected to one end of each of the primaries 65 and 66, respectively, while binding post C is connected to both the opposite ends of the primaries and to one end of each of the secondaries 67 and 69. Insulating disc 82 carries the terminals D, E, F, G, and H, the first three being connected to the outer ends of the windings 21 and 20 and to the common connection 73, while the last two are connected to the metallic rings 17 and 18, as indicated in Fig. 4. The dotted circles 47' and 48' shown in Fig. 4 indicate the relative positions of the transformers 47 and 48 on the disc 82, the latter being viewed from the right of Fig. 3.

The binding posts D, E, F, G, and H are suitably insulated from the member 79 through which they extend, by means of insulating bushings 85. The synchronous motor 19 is suitably supported within an auxiliary insulating casing 86 by means of a bracket 87 secured to the member 79. A metallic shield 88 is provided for shielding the transformers and is secured to the member 79 as by means of screws 89 and is formed with a boss 90 through which the various leads are inserted for connection to the transformers, the synchronous motor, and the lamps.

It will be seen from the foregoing description that there are thus provided novel means of the stroboscopic type for indicating the synchronism of a plurality of revolving mechanisms, particularly adapted for use on multi-engined aircraft for indicating the synchronism of the engines, and includes a novel transmission system for illuminating the gas discharge devices whereby high frequency currents between the engines and the indicator are eliminated and confined to the vicinity of the latter. Hence, interference with the reception of radio signals is substantially eliminated. The structure of the device is relatively simple, involving only a few elements arranged compactly in a unitary structure, thus providing an instrument which may be completely and quickly mounted on an instrument panel and connected to the various engines the synchronism of which is to be indicated.

Although only one embodiment of the invention has been illustrated and described in detail, various other changes in form and arrangement of parts, which will now appear to those skilled in the art, may be made without departing from the scope of the invention, and reference is therefore to be had to the appended claims for a definition of the limits of the invention.

What is claimed is:

1. The combination with a plurality of internal combustion engines, of means for indicating the synchronism thereof including means operated by and at said engines for producing low tension electrical impulses in synchronism with the rotation of said engines, means at said indicating means and remote from said engines but having electrical connections with said low tension producing means for translating certain of said low tension impulses into high tension alternating currents, whereby the connections between the low tension and high tension producing means may be effectively shielded to prevent radio interference without weakening the high tension currents, means adjacent and electrically connected to said high tension means and periodically illuminated by spark discharges produced therein by said high tension alternating currents in synchronism with certain of said engines, means responsive to the other of said low tension impulses and drivably connected to said illuminating means for rotating said illuminating means in synchronism with another of said engines whereby said illuminating means appear to be illuminated continuously and stationary when the engines are rotating in synchronism, and means for shielding the electrical connections between the engines and the indicating means.

2. The combination with a plurality of internal combustion engines having ignition circuits for operating them, of stroboscopic means for indicating the synchronism of said engines and including a plurality of electrical circuits independent of the ignition circuits of said engines, there being one circuit for each of said engines, means operated by and at said engines for periodically interrupting said circuits in synchronism with the rotation of the respective engine with which each circuit is associated, to produce low tension electrical impulses, means at said indicating means and remote from said low tension impulse producing means but having electrical connections with certain of said circuits for translating the low tension impulses therein into high tension alternating currents, whereby the connections and circuits may be effectively shielded to prevent radio interference without weakening the high tension currents, a plurality of glow discharge devices of the neon type connected to said translating means and periodically illuminated in synchronism with their respective engines by said high tension alternating currents, a synchronous electric motor connected to another of said circuits and responsive to the low tension impulses therein for rotating said glow discharge devices in synchronism with the rotation of the engine with which the latter circuit is associated whereby said glow discharge devices appear to be illuminated continuously and appear to be stationary when said engines are in synchronism, and means for shielding said electrical circuits between said engines and said indicating means.

3. In a system for indicating the synchronism of a plurality of internal combustion engines, which system includes means periodically illuminated in synchronism with the rotation of one of said engines and means for rotating said illuminating means in synchronism with another of said engines, the combination with said illuminating means of a source of direct current, an electrical circuit connected to said source, means operated by and at one of said engines for interrupting said circuit in synchronism with said engine to produce low voltage direct current impulses, means remote from said interrupting means and adjacent said illuminating means for translating said low voltage impulses into high tension alternating currents to cause illumination of said illuminating means whereby transmission of high tension alternating currents between the engines and the illuminating means is eliminated and whereby the system may be effectively shielded between the engines and the illuminating means to prevent radio interference without excessive electrical losses, and means for shielding the system between the engines and the illuminating means.

4. In a system for indicating the synchronism of a plurality of combustion engines, which system includes means periodically illuminated in synchronism with the rotation of one of said engines and means for rotating said illuminating means in synchronism with another of said engines, the combination with said illuminating means of a source of direct current, an electrical circuit including a pair of relatively movable contacts and said source, a cam driven by one of said engines for interrupting said contacts to produce low tension impulses in synchronism with said engine, a transformer adjacent said illuminating means and remote from said engine and having its primary winding connected in said circuit and its secondary winding connected to said illuminating means for translating said low tension impulses into high tension alternating currents to cause illumination of said illuminating means whereby transmission of high tension alternating currents between the engine and illuminating means is eliminated and whereby the system may be effectively shielded between the engines and the illuminating means to prevent radio interference without excessive electrical losses, and means for shielding said system between the engines and the illuminating means.

5. In combination, a plurality of engines, an engine synchronism indicator of the stroboscopic type connected to said engines for indicating when the latter are operating in synchronism and comprising an electrical circuit arrangement including separate means operated by and at each of said engines for producing low tension impulses in synchronism therewith, a casing remote from said engines and in which are located a plurality of illuminating devices electrically connected in said circuit arrangement and associated with certain of said impulse-producing means and periodically illuminated in synchronism with the respective engines to which they are associated, means also carried in said casing and included in said circuit arrangement and connected to said illuminating devices for translating low tension impulses produced by the operation of the engines into high tension alternating currents to cause illumination of said devices whereby only the low tension impulses are transmitted from the engines to the indicator, whereby the system may be effectively shielded between said engines and indicator without weakening the high tension currents, means in said casing and responsive to the low tension pulsating currents produced by the operation of another of the engines for rotating said illuminating devices in synchronism with the rotation of the latter engine whereby said devices appear to be illuminated continuously and appear to be stationary when all of the engines to which the indicator is connected are rotating in synchronism, and means for shielding the electrical connections between the indicator and the engines.

6. In combination with a plurality of internal combustion engines, an engine synchronism indicator of the stroboscopic type connected to said engines for indicating when the latter are operating in synchronism and comprising an electrically shielded casing remote from said engines and in which are located a plurality of glow discharge devices of the neon type for each engine except one, separate means at and operated by each of said plurality of engines for producing low tension impulses by the operation thereof and in synchronism therewith, a transformer for each of said glow discharge devices also located in said shielded casing adjacent said glow discharge devices, the primaries of said transformers being connected to the respective low tension impulse producing means to be energized by the low tension impulses produced by the operation of their respective engines, and the secondaries of said transformers being connected to their respective glow discharge devices for translating said low tension impulses into high tension alternating currents to cause illumination of said devices, thus providing for the transmission of only low tension impulses between the engines and the indicator whereby the system may be effectively shielded between the engine and the indicator without weakening the high tension currents, a motor for rotating said glow discharge devices, means including the impulse producing means of the one engine not provided with a glow discharge device for causing rotation of said motor in synchronism with the rotation of the latter engine, and means for shielding the electrical connections between the indicator and the engines.

7. The combination with a plurality of internal combustion engines provided with ignition systems for operating them, of means for indicating when said engines are operating in synchronism, said means being entirely independent of the ignition systems and comprising a shielded casing remote from said engines, a lamp of the neon type for each of said engines except one, said lamps being mounted for rotation in said casing, means for rotating said lamps in synchronism with the one engine, means for causing said lamps to flash in synchronism with the respective engines with which they are associated, said last-named means including means at said respective engines for producing low tension impulses by the operation thereof and in synchronism therewith, and a plurality of shielded transformers adjacent said lamps, there being one transformer for each lamp, the primary windings of said transformers being connected to said impulse producing means to be energized by the low tension impulses produced by said first engine and in synchronism therewith, and the secondary windings being connected to their respective lamps to translate said low tension impulses into high tension alternating currents to cause said lamps to flash, thus providing for the transmission of only low tension impulses between the engines and the indicating means whereby the system may be effectively shielded therebetween without weakening the high tension currents, and means for shielding the electrical connections between the engines and the indicating means.

8. The combination with a plurality of internal combustion engines having ignition systems for operating them, of means for indicating when said engines are operating in synchronism, said means comprising a relatively low voltage direct current source, a set of relatively movable electrical contacts at each engine but separate from and independent of the ignition systems of said engines and connected to said source, means for periodically opening and closing said contacts at a rate proportional to the speeds of their respective engines to produce a plurality of sets of low tension direct current impulses in synchronism with the respective speeds of said engines, an indicator remote from said engines and comprising a casing, an alternating current motor in said casing including a shaft, a plurality of neon lamps insulatingly mounted on said shaft and rotatable therewith at the front of said casing, a plurality of transformers mounted in said casing adjacent said alternating current motor, means connecting one of said relatively movable contacts to the field winding of said alternating current motor whereby the shaft of the latter and said neon lamps are rotated in synchronism with the speed of the engine with which said last-mentioned set of contacts is associated, means connecting the other sets of contacts, respectively, to the primaries of the transformers whereby the respective low tension impulses are translated into high tension alternating currents by the secondaries of said transformers, said secondaries being respectively connected to said neon lamps whereby the latter are periodically illuminated in synchronism with the speeds of the respective engines with which the other sets of contacts are associated so that upon rotation of said lamps they will appear to be stationary or rotating clockwise or counter-clockwise depending upon the relative speeds of all the engines, and shielding means for said casing and for the connecting means between the engines and transformers.

9. The combination with a plurality of internal combustion engines provided with ignition systems for operating them, of means for indicating when said engines are operating in synchronism, said means being independent of and electrically unrelated to said ignition systems whereby the ignition functions of the latter are unimpaired, and comprising an illuminating indicating device including a glow discharge lamp for one of said engines and located remotely therefrom, means for altering the visibility of said lamp in synchronism with the rotation of its associated engine, said latter means including a high tension circuit connected to said lamp, a device at and operated by said one engine for producing low tension direct current impulses in synchronism with said engine, and means connected to said high tension circuit for transforming the low tension direct current impulses into high tension alternating current impulses whereby said lamp is periodically illuminated in synchronism with the engine which produces the low tension impulses and with which said lamp is associated, said transforming means being located adjacent said lamp to avoid transmission of said high tension impulses, and means for rotating said lamp in synchronism with the rotation of the other of said engines, said lamp rotating means including a device at and operated by said other engine for producing low tension direct current impulses in synchronism with said engine, and a synchronous electric motor electrically connected to said last-mentioned impulse-producing means for energization by said low tension direct current impulses.

10. The combination with a plurality of internal combustion engines provided with ignition systems for operating them, of means for indicating when said engines are operating in synchronism, said means being independent of and electrically unrelated to said ignition systems whereby the ignition functions of the latter are fully sustained, and comprising an illuminating indicating device including a glow discharge lamp for one of said engines and located remotely therefrom, means for altering the visibility of said lamp in synchronism with the rotation of its associated engine, said latter means including a high tension circuit connected to said lamp, a device at and operated by said one engine for producing low tension direct current impulses in synchronism with said engine, and means connected to said high tension circuit for transforming the low tension direct current impulses into high tension alternating current impulses whereby said lamp is periodically illuminated in synchronism with the engine which produces the low tension impulses and with which said lamp is associated, and means for rotating said lamp in synchronism with the rotation of the other of said engines, said lamp rotating means including a device at and operated by said other engine for producing low tension direct current impulses in synchronism with said engine, and a synchronous electric motor electrically connected to said last-mentioned impulse-producing means for energization by said low tension direct current impulses.

11. The combination with a plurality of internal combustion engines provided with ignition systems therefor, means for indicating the synchronism of said engines, said means being independent of said ignition systems whereby the ignition function of the latter is fully sustained and comprising an illuminated indicating device, means independent of the ignition circuits of said engines for periodically illuminating said indicating device at a rate proportional to the rotation of one of said engines, means for rotating said device at a speed proportional to the rotation of another of said engines, and means also independent of said ignition circuits for producing electrical currents to control said last named means.

ADOLF URFER.